United States Patent [19]

Ishimura et al.

[11] Patent Number: 4,914,469
[45] Date of Patent: Apr. 3, 1990

[54] POWER SUPPLY SYSTEM FOR A CAMERA

[75] Inventors: Toshihiko Ishimura; Reiji Seki; Hirokazu Kuroda; Shuji Izumi; Akira Okuno, all of Osaka, Japan

[73] Assignee: Minolta Camera Kabushiki Kaisha, Osaka, Japan

[21] Appl. No.: 352,290

[22] Filed: May 15, 1989

[30] Foreign Application Priority Data

May 16, 1988 [JP] Japan ................................ 63-119766

[51] Int. Cl.⁴ .............................................. G03B 7/26
[52] U.S. Cl. .................................. 354/484; 323/318; 323/351
[58] Field of Search .................. 323/318, 349, 351; 354/484

[56] References Cited

U.S. PATENT DOCUMENTS

| 4,126,874 | 11/1978 | Suzuki et al. | 354/484 |
|---|---|---|---|
| 4,429,974 | 2/1984 | Suzuki et al. | 354/484 |
| 4,522,480 | 1/1985 | Kawabata et al. | 354/484 |
| 4,553,140 | 11/1985 | Maida | 354/484 |
| 4,636,056 | 1/1987 | Kobayashi et al. | 354/484 |
| 4,645,326 | 2/1987 | Kiuchi et al. | 354/484 |
| 4,724,456 | 2/1988 | Ishimura et al. | 354/484 |
| 4,855,781 | 8/1989 | Hoshino | 354/484 |

FOREIGN PATENT DOCUMENTS

| 78429 | 5/1985 | Japan. |
| 78430 | 5/1985 | Japan. |
| 78431 | 5/1985 | Japan. |
| 140326 | 7/1985 | Japan. |

Primary Examiner—Patrick R. Salce
Assistant Examiner—Jeffrey Sterrett
Attorney, Agent, or Firm—Burns, Doane, Swecker & Mathis

[57] ABSTRACT

A power supply system for a camera supplies electrical power to a light measuring circuit, a display circuit and others. During a hold state before the camera turns into a standby state, the power supply system supplies a boosted electrical power intermittently to the light measuring circuit, the display circuit and others, so that photographic information such as shutter speed and aperture value based on the measurement of the light measuring circuit are displayed on a display and power consumption in the hold state can be made small.

6 Claims, 2 Drawing Sheets

POWER SUPPLY SYSTEM FOR A CAMERA

BACKGROUND OF THE INVENTION

1. Field of the Invention

The present invention relates to a power supply system for a camera which supplies electrical power to a light measuring circuit, a display circuit and others in a hold state which is held during a predetermined period of time before the camera turns into a standby state, and a camera system to control the operation of the light measuring circuit and the display circuit in the hold state.

2. Description of the Prior Art

Conventional cameras, having a display panel for displaying photographic information such as aperture value and shutter speed, turns into a standby state through a hold state held during a predetermined period of time. In the hold state of the conventional cameras a light measuring circuit, a display circuit and their control circuits are operating as usual. The purpose of the hold state is to facilitate a setting operation of the photographic information or confirmation of it after a shutter is released.

FIG. 2 shows an example of a power supply system for a camera of a conventional type. In FIG. 2, B is a battery as a power supply source; 1 is a power supply circuit; 2 is a booster circuit comprising a DC/DC converter etc. in the circuit 1; 3 is a control circuit comprising a microcomputer including a RAM which controls camera operation and also memorizes data such as photographing conditions (shutter speed, aperture value, etc.) in the RAM; 4 is a display circuit using a liquid crystal device; 5 is a motor driving circuit; 6 is a motor for driving a lens etc.; 7 is a switch to start the control operation of the microcomputer in the circuit 3.

An input terminal Vin of power supply circuit 1 is connected to a positive electrode of the battery B; an output terminal Vout in the power supply circuit 1 is connected to power supply input terminals Vcc1 and Vcc2 of the control circuit 3 and the display circuit 4 respectively, and also connected to an anode of a voltage regulating diode D4 through a resistor R2; the anode of the diode D4 is connected to a reference voltage terminal Vr of the display circuit 4 and the cathode is grounded; a power supply control terminal PWC of the control circuit 3 is connected to a control terminal Vc of the power supply circuit 1.

The positive electrode of the battery B is connected to a power supply input terminal Vcc3 of the motor driving circuit 5 and to an anode of a light emitting diode (LED) D3; a cathode of the diode D3 is connected to the display circuit 4 through a resistor R1; the motor driving circuit 5 is a load circuit which necessitates comparatively large current and therefore electrical power is directly supplied from the battery B.

The power supply circuit 1 is explained in the following: an input terminal IN of the booster circuit 2 is connected to the input terminal Vin of the power supply circuit 1, and an output terminal OUT of the booster circuit 2 is connected to the output terminal Vout of power supply circuit 1 through the diode D2; a control terminal C of the booster circuit 2 is connected to a control terminal Vc of the power supply circuit 1; the input terminal Vin of the power supply circuit 1 is connected to the anode of the diode D1, and the cathode of the diode D1 is connected to the output terminal Vout of the power supply circuit 1.

An OR circuit relating to the booster circuit 2 and the battery B is constituted by the diode D1 and the diode D2, and the circuit is so constituted that the output voltage of either of the two, the booster circuit 2 or the battery B, which has a higher voltage is output from the output terminal Vout.

The operation of the power supply circuit 1 is explained in the following: when the switch 7 is OFF and the control circuit 3 is not started, a control signal "HIGH" is output from the power supply control terminal PWC of the control circuit 3 to the power supply circuit 1, and the booster circuit 2 in the power supply circuit 1 is not in operating state; at this time, the voltage of the battery B is output to the output terminal Vout of the power supply circuit 1 through the diode D1 and it is supplied to the power input terminals Vcc1 and Vcc2 of the control circuit 3 and the display circuit 4, and the memory contents of the RAM in the control circuit 3 are held by the battery power; the voltage of the battery B is applied to the anode of the voltage regulating diode D4 and a reference voltage for driving the liquid crystal device is generated by the diode D4 and it is input to the reference voltage input terminal Vr of the display circuit 4; if the voltage of the battery B is lowered, it may cause the hold of the memory contents in the RAM impossible or the lowering the reference voltage, which degrades the contrast of display on the liquid crystal device.

The power for the motor driving circuit 5 and the light emitting diode D3 are supplied from the battery B independent of ON or OFF of the switch 7.

When the switch 7 is turned ON, a signal "LOW" is output from the power supply control terminal PWC and supplied to the control terminal Vc of the power supply circuit 1 to start the booster circuit 2 in the power supply circuit 1. At this time, the output voltage of the booster circuit 2, in which the battery voltage is boosted, is output to the output terminal Vout of the power supply circuit 1 through the diode D2 and is supplied to the respective power supply terminals Vcc1 and Vcc2 of the control circuit 3 and display circuit 4 and the microcomputer in the control circuit 3 starts the control operation. The output voltage of the booster circuit 2 is also applied to the anode of the voltage regulating diode D4 through the resistor R2 and the reference voltage for driving the liquid crystal device is generated by the diode D4.

When the sequence of the control operation of the microcomputer is advanced to the step in which the motor 6 for driving the lens etc. is driven, a large current flows in the motor driving circuit 5 and the voltage of the battery B is lowered; it causes to lower the applied voltage to the light emitting diode D3 and the brightness of the diode D3 is lowered. After that, when the control operation of the microcomputer is finished, the control signal "HIGH" is output from the power supply control terminal PWC of the control circuit 3 and supplied to the booster circuit 2 and then the operation of the circuit 2 is stopped, and the voltage of the battery is supplied to the control circuit 3, display circuit 4 and the voltage regulating diode D4 through the diode D1 in the power supply circuit 1.

Furthermore, since the control circuit 3, the display circuit 4 and the light measuring circuit (not shown) are supplied the electrical power as usual during the hold state, the electricity consumption during the hold state cannot be neglected.

As for the ways of decreasing power consumption, following examples are known to the public: a means wherein when an automatic exposure setting is held, the power supply to a measuring circuit is stopped (for example Japanese Patent laid-open No. 78429/85); a means wherein when a light measurement switch is kept ON for a certain time, the power supply to the light measuring circuit is cut off and the power supply is resumed with the ON of a shutter release switch (for example Japanese Patent laid-open No. 78430/85 and No. 78431/85); a means wherein power is supplied periodically in a fixed period during a light measuring switch is kept ON (Japanese Patent laid-open No. 140326/85).

In these known power supply system, matters after a light measurement switch is turned OFF are not taken into consideration. Therefore, there still remained a problem to be solved on the cut down of the power consumption to lengthen the time of the hold state.

SUMMARY OF THE INVENTION

A main object of the present invention is to provide an improved power supply system which can reduce power consumption in the hold time, and lengthen the hold time.

Another object of the present invention is to provide an improved power supply system which can supply stable electric power to the light measuring circuit and the display circuit.

A further object of the present invention is to provide an improved camera system which can control the operation of the light measuring circuit and display circuit with low power consumption in the hold state.

These and other objects will become apparent from the following detailed description taken in connection with the accompanying drawings.

DETAILED DESCRIPTION OF THE PREFERRED EMBODIMENTS

Figure 1:
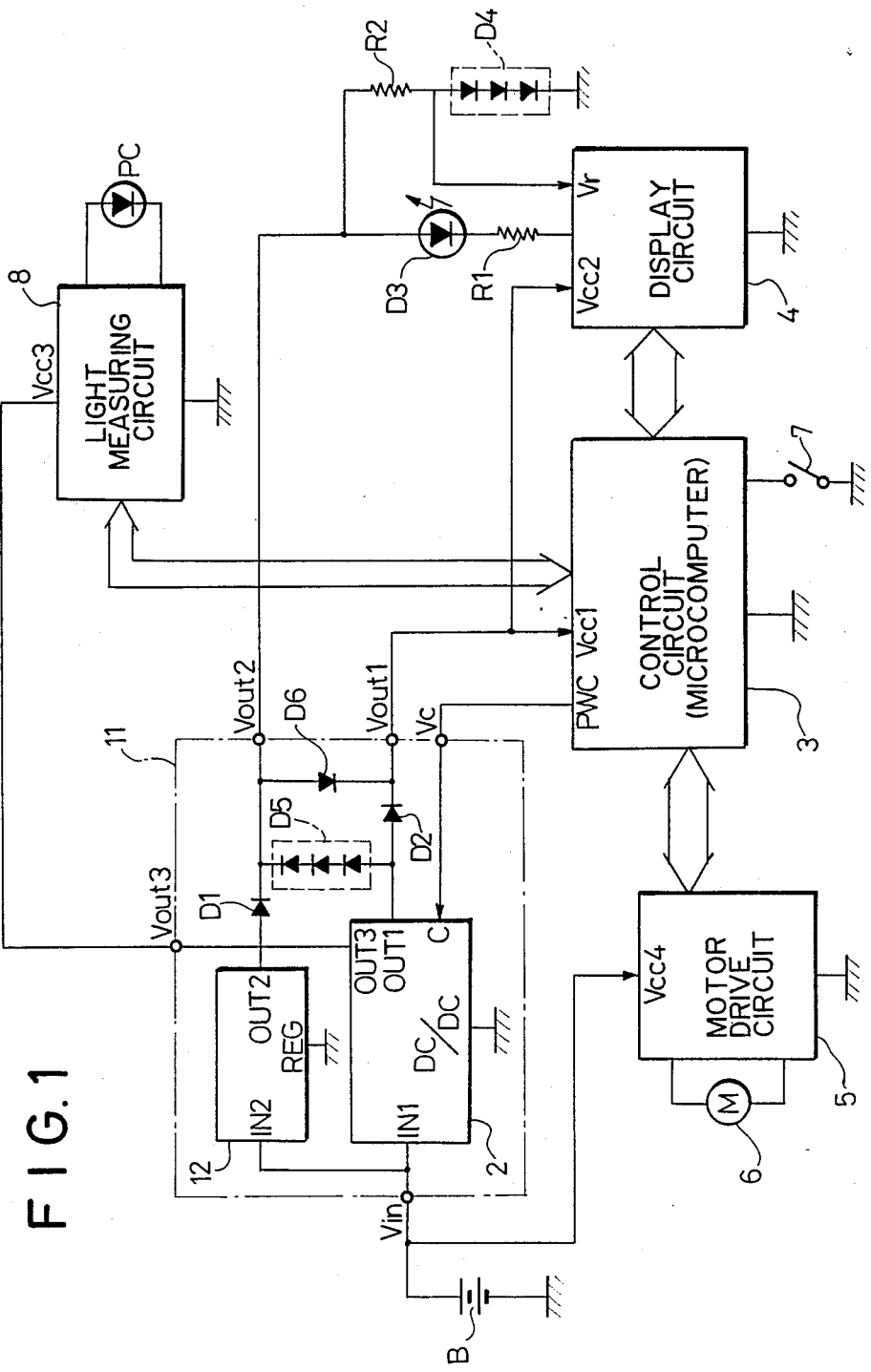
FIG. 1 shows a power supply system for a camera in an embodiment of the present invention.

An embodiment of the present invention is explained referring to FIG. 1 in the following. In FIG. 1, similar symbols are used for similar members to those in FIG. 2 in which a prior art is explained.

An input terminal Vin of a power supply circuit 11 is connected to a positive electrode of a battery B; an output terminal Vout1 of the power supply circuit 11 is connected to respective power supply input terminals Vcc1 and Vcc2 of a control circuit 3 and a display circuit 4; an output terminal Vout2 of the power supply circuit 11 is connected to an anode of a light emitting diode D3, and also connected to a voltage regulating diode D4 through a resistor R2; the anode of the diode D4 is connected to a reference voltage terminal Vr of the display circuit 4 and its cathode is grounded. All load circuits connected to the output terminal Vout2 require a stabilized voltage.

Figure 2:
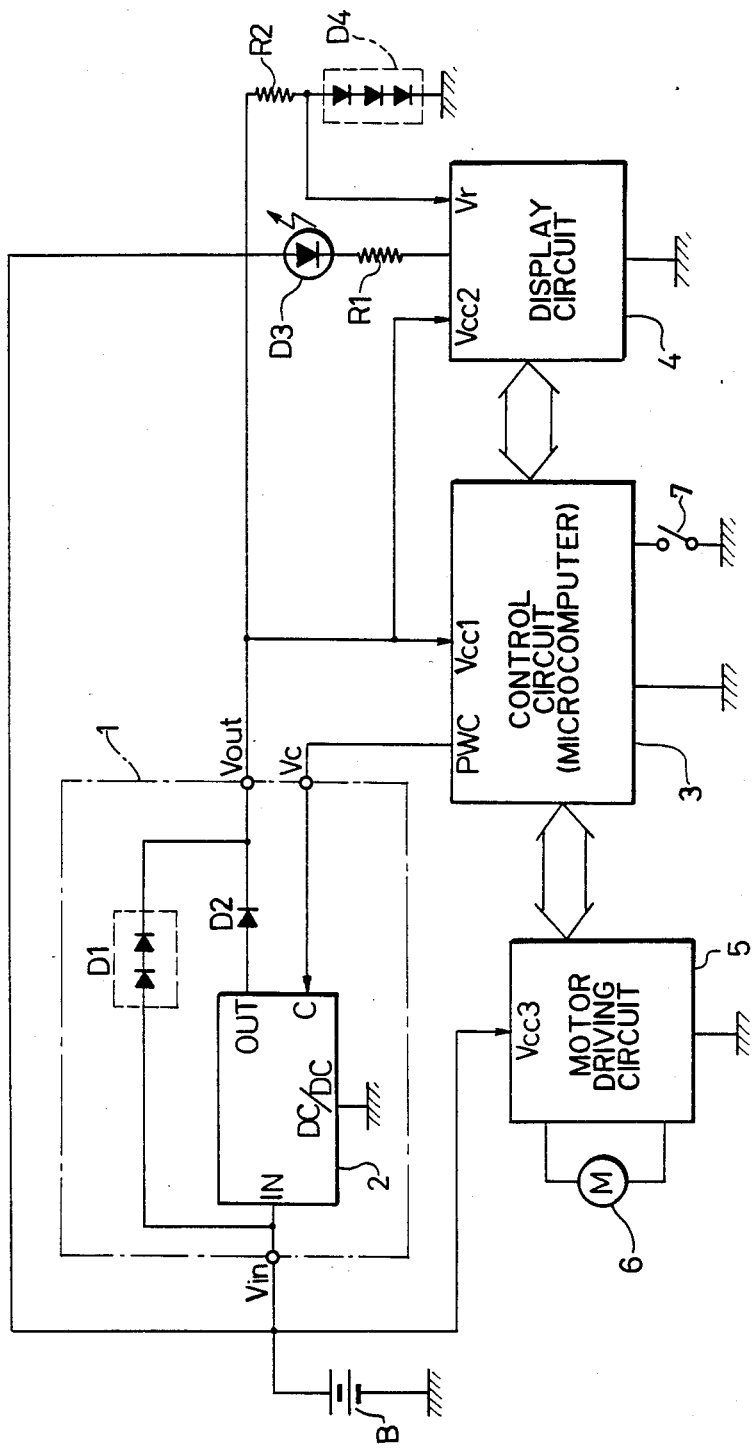
FIG. 2 shows a power supply system for a camera of a conventional type.

A constitution in which the battery B, a motor driving circuit 5 which consumes a large power, the control circuit 3 and the display circuit 4 are connected to each other is the same as that shown in FIG. 2.

In the power supply circuit 11, an input terminal IN1 of a booster circuit 2 comprising a voltage regulator and an input terminal IN2 of a voltage stabilizing circuit 12 comprising a DC/DC converter etc. are connected to the input terminal Vin; an output terminal OUT2 of the voltage stabilizing circuit 12 is connected to the output terminal Vout2 of the power supply circuit 11 through a diode D1; a control terminal C of the booster circuit 2 is connected to a control terminal Vc of the power supply circuit 11; an output terminal OUT1 of the booster circuit 2 is connected to an anode of a diode D2 and to an anode of a diode D5; the cathodes of the diode D2 and the diode D5 are respectively connected to the output terminals Vout1 and Vout2 of the power supply circuit 11; the cathode of diode D1 is connected to an anode of a diode D6; a cathode of the diode D6 is connected to the cathode of the diode D2.

In other words, an OR circuit relating to the output voltages of the booster circuit 2 and the voltage stabilizing circuit 12 is constituted with the diode D1 and the diode D5 and another OR circuit relating to the output voltages of the booster circuit 2 and the voltage stabilizing circuit 12 is constituted with the diode D2 and the diode D6. Therefore, one of either of the two, the output voltage of the booster circuit 2 through the diode D2 or that of the voltage stabilizing circuit 12 through the diode D6, which has a higher voltage is output from the output terminal Vout 1. On the other hand, from the output terminal Vout 2, one of either of the two, the output voltage of the booster circuit 2 through the diode D5 or that of the voltage stabilizing circuit 12 through the diode D1, which has a higher voltage.

A light measuring circuit 8 is provided in this embodiment, which receives the output of a light receiving element PC and is controlled by the control circuit 3; electrical power necessary for the light measuring circuit 8 is supplied to its input terminal Vcc3 from the output terminal Vout3 of the power supply circuit 11; the output terminal OUT3 of the booster circuit 2 is also connected to the output terminal Vout3. When a switch 7, which is used for starting light measuring operation etc., is turned ON, the control circuit 3 controls a control signal output from a power supply control terminal PWC to be "LOW", and when the switch 7 is turned OFF or a control operation of the control circuit 3 is finished, the control circuit 3 controls the camera to be in a hold state. Under this state, the control signal output from the power supply control terminal PWC changes over to "LOW" intermittently from "HIGH" during a fixed time determined by a timer built-in or attached outside in the control circuit 3.

The operation of the power supply system is explained. When the switch 7, which is used for starting of light measuring operation etc., is in a OFF state and the control circuit 3 is not started yet, the control signal "HIGH" is output from the power supply control terminal PWC of the control circuit 3 to the power supply circuit 11, and in that state the booster circuit 2 in the power supply circuit 11 is not in operating state; at this time the voltage stabilizing circuit 12 is operating to stabilize the voltage of the battery B and its output voltage is output to the output terminal Vout2 through diode D1; the output voltage output to the Vout2 is also output to Vout1 through diode D6; from these output terminals Vout1 and Vout2 the output voltage of the voltage regulating circuit 12 is supplied to the anode of the light emitting diode D3 and to the anode of the voltage regulating diode D4 through the resistor B2 and is also supplied to the power supply input terminals Vcc1 and Vcc2 of the control circuit 3 and the display circuit 4. By the output voltage of the voltage stabilizing circuit 12, the memory contents in a RAM in the control circuit 3 is held and the liquid crystal reference voltage for driving a liquid crystal device in the display circuit 4 is generated in the voltage stabilizing diode D4 to be supplied to the reference voltage input terminal Vr.

When the switch 7 is turned ON, the control signal "LOW" is output from the power supply control terminal PWC of the control circuit 3 and it is supplied to the control terminal Vc of the power supply circuit 11 and then the booster circuit 2 in the power supply circuit 11 starts its operation; at this time an output voltage of the booster circuit 2, a boosted voltage of the battery voltage, is output to the output terminal Vout1 of the power supply circuit 11 through the diode D2 and applied to power supply input terminals Vcc1 and Vcc2 of the control circuit 3 and display circuit 4; then the microcomputer which constitute the control circuit 3 starts the control operation; the output voltage of the voltage stabilizing circuit 12 is output from the output terminal Vout2 of the power supply circuit 11 through the diode D1 and supplied to the light emitting diode D3 and to the voltage regulating diode D4.

While the light measuring circuit 8 is held in its operating state by the control operation of the microcomputer, and a measuring data is read periodically at a predetermined frequency from the light measuring circuit 8 by the microcomputer. The microcomputer calculates the exposure data such as aperture value and shutter speed based on the light measuring data and outputs the calculated exposure data to the display circuit in the same frequency as the frequency of reading the light measuring data.

The frequency of reading the light measuring data is shorter than the frequency that the control signal output from the power supply control terminal PWC changes over to "LOW" intermittently from "HIGH" in the hold state.

In the next step, when the control operation by the microcomputer is advanced and the motor 6 is driven to drive a lens etc., a large current flows in the motor driving circuit 5 and the voltage of the battery B is lowered for a time, so that the input voltage of the voltage stabilizing circuit 12 is lowered and stops its stabilizing operation, at this time the output voltage of the booster circuit 2 is output to the output terminal Vout2 through diode D5 and it is supplied to the light emitting diode D3 and the voltage regulating diode D4. By this arrangement, even though the voltage of the battery B is lowered, the brightness of the light emitting diode D3 is not lowered and also the reference voltage for driving the liquid crystal device generated by the voltage regulating diode D4 is not lowered; the contrast of display on the liquid crystal device is therefore not degraded.

After that the switch 7 is turned OFF or the control operation of the microcomputer is finished, the camera is turned into the hold state.

According to the present invention, electric power is intermittently supplied in the hold state. That is, the control circuit 3 operates to output the control signals "LOW" intermittently in a predetermined period of time. Interlocking with the signal "LOW", the electric power is supplied to the light measuring circuit 8 and the display circuit 4 to be started their operation and interlocking with the signal "HIGH" above operation is stopped, so that the camera repeats start and stand-by in the hold state. The exposure data such as shutter speed and aperture value data in the hold state is renewed at each start.

In this embodiment, even when the control signal "HIGH" is output from the power supply control terminal PWC and the operation of the booster circuit is stopped, the output voltage Vout2 of the voltage stabilizing circuit 12 of the power supply circuit 11 is supplied to the control circuit 3, the display circuit 4, the light emitting diode D3 and the voltage regulating diode D4. It is therefore possible to supply a stable constant voltage to the display circuit 4 and the light emitting diode D3 in spite of repeated start and stop of the camera.

As described in the above according to the present invention, in the hold state of the camera, the electric power is supplied to the light measurement circuit and the display circuit intermittently in a fixed period, so that power consumption in a hold state can be decreased and it is thereby made possible to lengthen the hold time to help photographers confirm the photographing information.

What is claimed is:
1. An electrical power supply system in a camera having an electrical circuit, comprising:
    (a) a power source;
    (b) power supply means for supplying electrical power of said power source to said electrical circuit;
    (c) switching means having a first state and a second state and arranged to be operable manually; and
    (d) control means for controlling said power supply means to supply the electrical power continuously to said electrical circuit when said switching means is in the first state and to supply the electrical power intermittently when said switching means is in the second state.

2. An electrical power supply system as claimed in claim 1, further comprising:
    (e) timer means for counting a predetermined period in response to the fact that a state of said switching means changes into the second state from the first state;
wherein said control means controls said power supply means to supply the electrical power intermittently to the electrical circuit during the predetermined period.

3. An electrical power supply system as claimed in claim 2, wherein said control means stops said power supply means supplying the electrical power to said electrical circuit after a lapse of the predetermined period.

4. An electrical power supply system as claimed in claim 3, wherein said power source is a battery and said power supply means is a DC/DC converter which converts a voltage of said battery into a predetermined voltage.

5. An electrical power supply system as claimed in claim 3, wherein said electrical circuit is a light measuring circuit.

6. An electrical power supply system in a camera having an electrical circuit, comprising:
    (a) a power source
    (b) power supply means for supplying electrical power of said power source to said electrical circuit;

(c) switching means having a first state and a second state and arranged to be operable manually; and (d) control means for controlling said power supply means to supply the electrical power continuously to said electrical circuit when said switching means is in the first state and to supply the electrical power intermittently in response to the fact that a state of said switching means changes into the second state from the first state.

* * * * *